United States Patent [19]

Powell

[11] Patent Number: 4,564,839

[45] Date of Patent: Jan. 14, 1986

[54] FEATURE REFERENCED ERROR CORRECTION APPARATUS

[75] Inventor: Norman F. Powell, Laurel, Md.

[73] Assignee: The United States of America as represented by the Secretary of the Air Force, Washington, D.C.

[21] Appl. No.: 417,928

[22] Filed: Sep. 14, 1982

[51] Int. Cl.⁴ .............................................. G01S 13/90
[52] U.S. Cl. ................................................ 343/5 CM
[58] Field of Search ............. 343/5 DP, 5 CM, 5 FT, 343/5 MM

[56] References Cited

U.S. PATENT DOCUMENTS

| 4,034,370 | 7/1977 | Mims | 343/5 CM |
| 4,084,158 | 4/1978 | Slawsby | 343/5 DP |
| 4,219,811 | 8/1980 | Herman et al. | 343/5 CM |
| 4,227,194 | 10/1980 | Herman et al. | 343/5 DP |

OTHER PUBLICATIONS

Wu, "A Digital Approach to Produce Imagery from SAR Data", JPL, California Ins. Tech., Technical Paper, Dec. (1974).

Primary Examiner—Thomas H. Tarcza
Assistant Examiner—K. R. Kaiser
Attorney, Agent, or Firm—Donald J. Singer; William Stepanishen

[57] ABSTRACT

A feature referenced error correction apparatus utilizing the multiple images of the interstage level image format to compensate for positional displacement errors in the synthetic aperture radar imaging. Error compensation is accomplished through the registration of key features of sub-aperture images and by the generation of an error correction signal in response to the sub-frame registration errors.

4 Claims, 6 Drawing Figures

FEATURE REFERENCED ERROR CORRECTION APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an error correction apparatus and in particular to a feature referenced error correction apparatus.

In the prior art, there has been a continuing effort to develop radar systems which are suitable for high resolution application such as ground-mapping and air reconnaissance. Initially, this finer resolution was achieved by the application of pulse-compression techniques to conventional radar systems which were designed to achieve range resolution by the radiation of a short pulse, and angular, or azimuth, resolution by the radiation of a narrow beam. The pulse-compression techniques provided significant improvement in the range-resolution of the conventional radar systems, but fine angular resolution by the radiation of a narrow beam still required a large diameter antenna which was impractical to transport with any significant degree of mobility. Subsequent to the development of pulse compression techniques, synthetic aperture radar techniques were developed for improving the angular resolution of a radar system to a value significantly finer than that directly achievable with a radiated beamwidth from a conventional antenna of comparable diameter.

In general, synthetic array processing requires that a quadratically varying phase correction i.e., an azimuth focus reference function be applied to the pre-summed sequentially derived signal vectors before integrating them, with (or without) amplitude weighting, to obtain each resolved element's amplitude. This quadratic azimuth focus reference function is calculated as a function of range, velocity, look angle and wavelength. Multiplication of successively derived signal vector returns from a particular ground scatter by a quadratic focus reference function, and integration of the resulting products is in essence the correlation process. Many parameters may affect the accuracy of this quadratic phase correction such as a change in direction of the aircraft deriving the data, variations in the height of ground features, and errors in the velocity data which, even when derived from inertial platforms, may be only marginally accurate to achieve optimal focus.

SUMMARY OF THE INVENTION

The present invention utlizes a radar signal data focusing technique to provide a feature referenced error correction loop at the interstage level in a two-stage second processor. After the first signal processor stage, the data signal image format comprises one of multiple images for a given frame. Each individual image is associated with a specific segment of a synthetic radar aperture. A positional shift of the data in the subaperture segment results in an error in the processed image. A preprocessor operates on the interstage subaperture images to convert the signal data into a key feature format which characterizes the interstage images in terms of high gradient edges. The interstage data are then compared to measure the positional displacements between the scenes of the various subaperture images. The measured positional displacements are then converted to an error correction signal to provide proper image registration.

It is one object of the present invention, therefore, to provide an improved feature referenced error correction apparatus.

It is another object of the invention to provide an improved feature referenced error correction apparatus wherein radar signal data is corrected at the interstage level of a two stage signal processing system.

It is yet another object of the invention to provide an improved feature referenced error correction apparatus wherein the signal data comprises an image format which one of multiple images of a given frame in which each individual image is associated with a specific sub-segment of the synthetic aperture It is a further object of the invention to provide an improved feature referenced error correction apparatus in which the interstage sub-aperture images are converted to a key feature format which characterizes the interstage images in terms of high gradient edges.

These and other advantages, objects and features of the invention will become more apparent from the following description taken in conjunction with the illustrative embodiment in the accompanying drawings.

DESCRIPTION OF THE PREFERRED EMBODIMENT

Figure 1:
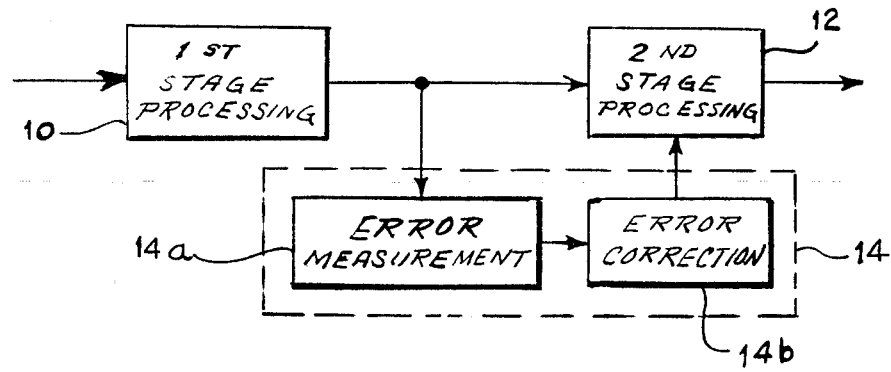
FIG. 1 is a block diagram of the feature referenced error correction apparatus according to the present invention.

Referring now to FIG. 1, there is shown a block diagram of the feature referenced error correction apparatus in generalized form. In its basic form, the feature referenced error correction apparatus is utilized in a two stage radar signal data processing system which comprises a first stage processing unit 10 and a second stage processing unit 12. The feature referenced error correction apparatus 14 is positioned between the first and second stage processing units 10, 12. The feature referenced error correction apparatus comprises an error measurement unit 14a and an error correction unit 14b.

Figure 2:
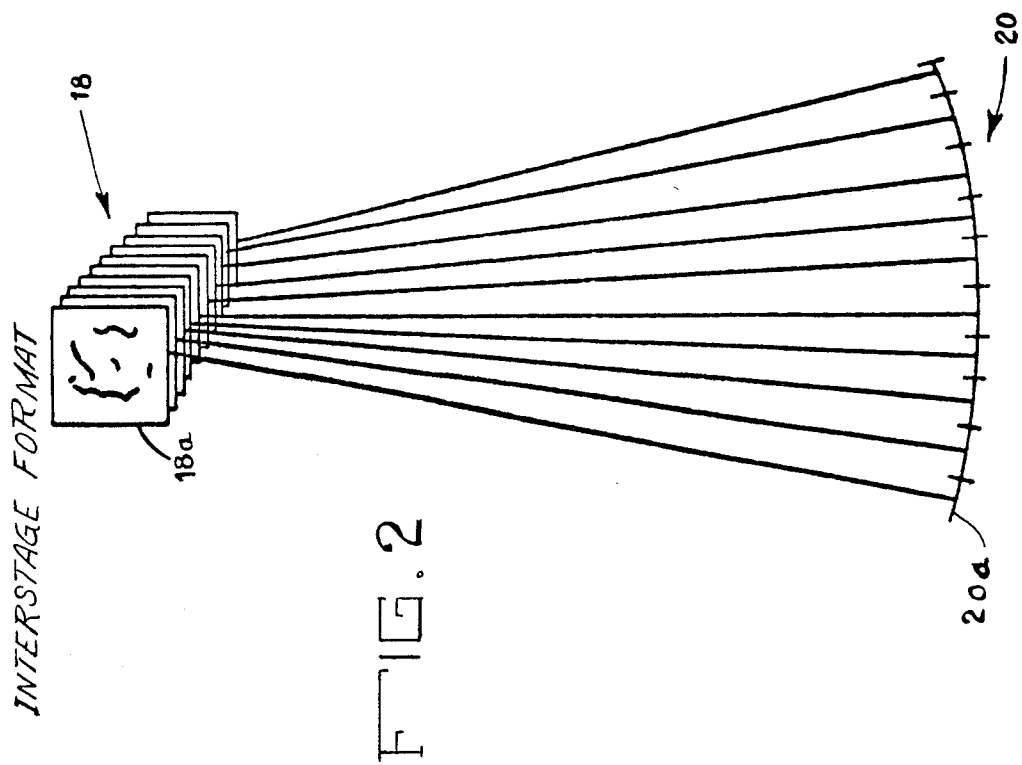
FIG. 2 ia block diagram of the interstage format of the feature referenced error correction apparatus.

In FIG. 2, there is shown the interstage image format of the feature referenced error correction apparatus as it relates to a synthetic aperture. It may be seen that at the interstage level, the image format, 18 is one of multiple images of a given frame. It will be noted that each individual image, for example 18a, is associated with a specific segment 20a of the synthetic aperture 20. It is at this interstage point (the point between the first and second stage processing units 10, 12 of FIG. 1) that measurement of sub-aperture beam pointing errors by means of the registration of key features in the interstage format is accomplished. It is also at this interstage level that conversion of the sub-aperture beam pointing errors into a correction polynomial for the second stage processing unit is completed.

Figure 3:
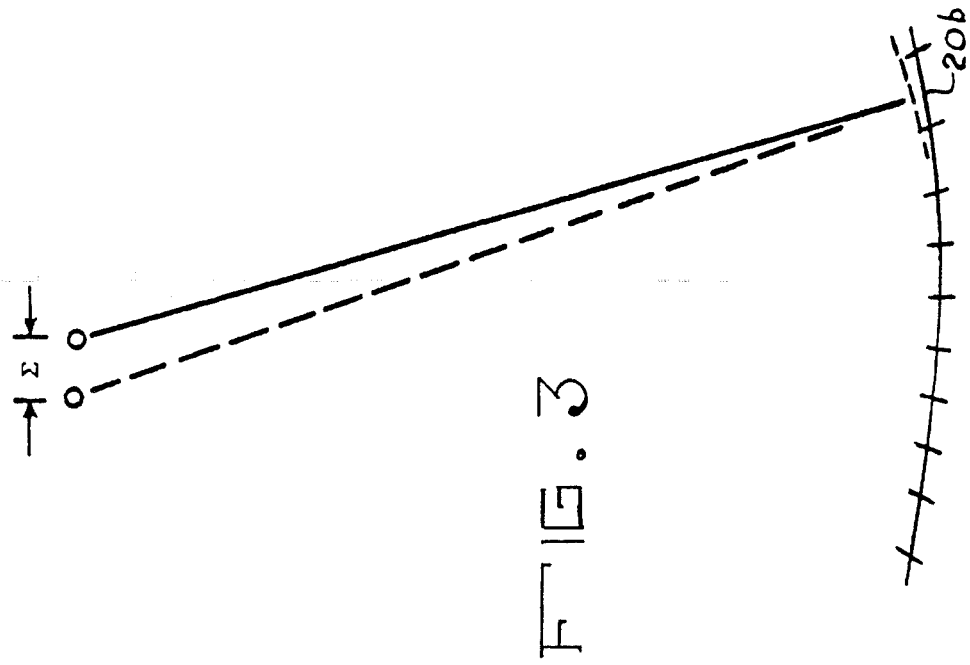
FIG. 3 is a pictorial view of the measurement concept of the present invention.

There is shown in FIG. 3 the specific approach for error measurement that is utilized in the feature referenced error correction apparatus. It may be seen that an uncompensated error which is associated with synthetic aperture formation in a given subaperture segment 20b, will result in a positional shift of the data in a processed image. Thus, the following measurements and functions will be made and derived to accomplish a correction for the positional shift of the image data. First, it is necessary to measure key feature displacements at the sub-aperture level. This will result in a large number of data sets for each interstage format and therefore will contribute to greater precision in displacement error measurement. A polynomial error function will be derived from the large data set which will represent registration error versus the position along the aperture. Once the registration error function is established, it will be converted to a synthetic aperture correction function Thus, it may be seen that when given the imagery from the subaperture segments, as is available at the interstage level of a two-stage process, the positional shifts of key features can be measured. It may be noted that, since a typical image frame size contains thousands of pixels even at the interstage level, the associated large data set provides a basis for precision measurement of the positional shift even though the resolution at the interstage level may be very slight. The measurements of the positional shifts of subaperture image features across the full aperture will thus provide a basis for generating a correction function that can be applied to the data prior to a second stage focusing operation wherein it will be combined with the subaperture data into a single finer resolution image.

The feature referenced error apparatus for registering features at the interstage level involves the use of a feature extraction processor which is operating on the interstage data in order to extract the edges of the image. The advantage of the key feature format is that image data are reduced to the most significant information that is relevant to image registration, and the format is one of digital locations of high gradient edges so that a registration function can be easily accomplished. Moreover, the amount of data which is required to represent a given scene is reduced by an order of magnitude relative to a grey scale representation such that processing to accomplish the registration function is minimized.

Figure 4:
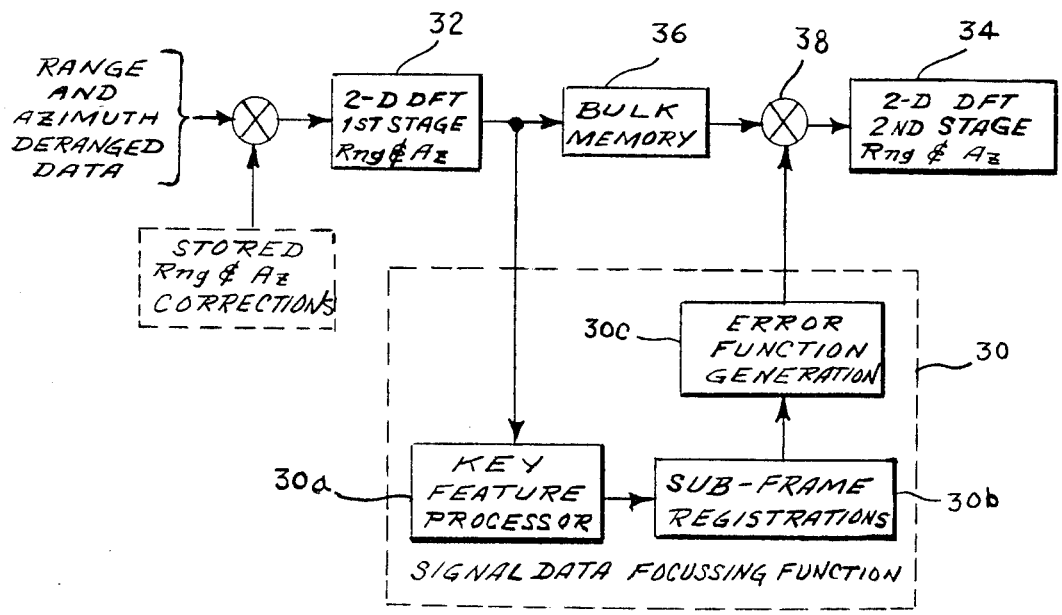
FIG. 4 is a detailed block diagram of the feature referenced error correction apparatus in a signal processing chain.

Turning now to FIG. 4, there is shown a detailed block diagram of the feature referenced error correction apparatus 30 positioned in a signal processing chain between the first and second stage processing units 32,34. A bulk memory unit 36 is provided to store signal data prior to its application to the second stage processing unit 34. The output data from the first stage processing unit 32 is applied to both the bulk memory unit 36 and the key feature processor unit 30a. The key feature processor unit 30a operates on the signal data which comprises the interstage sub-aperture images in order to convert the signal data to a key feature format which characterizes the interstage images in terms of edges. The key feature format which is the output of the key feature processor unit 30a is applied to the sub-frame registration unit 30b where the key features from frame to frame are registered to establish positional displacements. The key feature format interstage data are then compared to measure the positional displacements between the scenes of the various subaperture images in the error function generator unit 30c. The error function generator unit 30c converts the measured positional displacements to an error correction signal which is applied to the combiner unit 38. The error correction signal is combined with the signal data from the bulk memory unit 36 and the combination signal is applied to the second stage processing unit 34.

Figure 5:
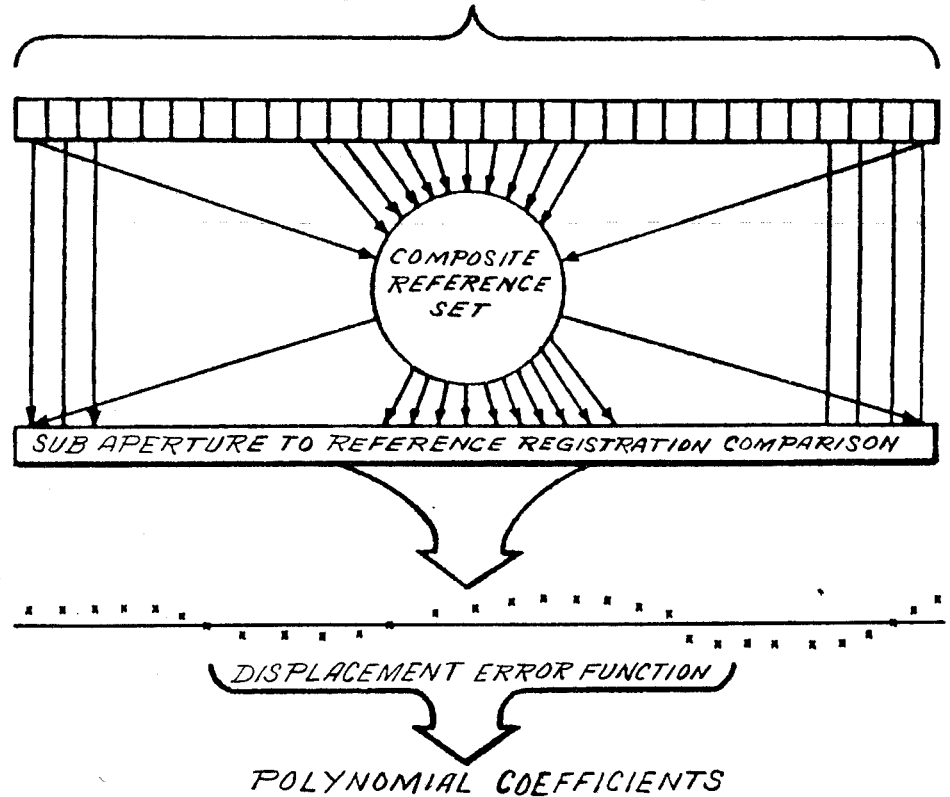
FIG. 5 is a conceptional view of the feature referenced error correction apparatus.

There is shown in FIG. 5 a block diagram of the means for generating an image displacement error function across the entire radar aperture. The central concept that is illustrated here is the generation of a composite reference data set which represents the average location of the various key features of the image. This reference data set is then used for registration with key features of each subaperture image such that the error measurements over the entire radar aperture are performed relative to an average set of feature data. The sub-aperture image displacement errors are then processed to derive a set of polynomial coefficients which represent the error function signal.

Figure 6:
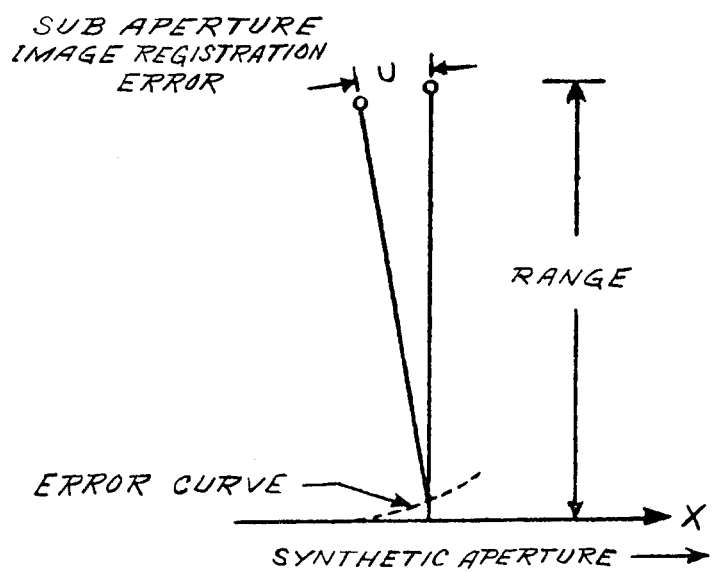
FIG. 6 is a pictorial representation of the along range error function in relation to the sub-aperture image registration errors.

The manner in which positional shifts between subaperture images can be related to an along range error function over the synthetic aperture is illustrated in FIG. 6. It may be noted that the along range error as a function of the aperture dimension (x) is simply $R_c(x) = 1/R \int u(x)dx$ where $u(x)$ is the subaperture image displacement function as derived from the registration measurements. It also may be noted that the accuracy for the feature referenced error correction apparatus can be predicted based on typical measured data from registration experience with similar data sets represented in the key feature format. It has been demonstrated that the registration accuracy achievable is given by the expression $$E = \frac{\Delta}{\sqrt{N}} \qquad (1)$$

where $\Delta$ is the image resolution prior to conversion to the key feature format, and N is the number of feature elements (edges or blobs) extracted from the image. This expression (1) is based on a factor of 2 over sampling relative to the resolution cell which is the case at the interstage level. Typically, the number of feature elements is $\sqrt{M}$ where M is the number of resolution elements in the image such that $$E = \frac{\Delta i}{(M)^{\frac{1}{4}}} \qquad (2)$$

Although the invention has been described with reference to a particular embodiment, it will be understood to those skilled in the art that the invention is capable of a variety of alternative embodiments within the spirit and scope of the appended claims.

What is claimed is:

1. A feature referenced error correction apparatus comprising in combination:
   a first and second stage processing means to process signal data from a synthetic aperture radar, said first stage processing means receiving said signal data from said synthetic aperture radar, said second stage processing means operatively connected to said first stage processing means to recevie the output signal therefrom, and means for preprocessing said signal data from said first stage processing means, said signal data comprising multiple images of a given frame from said synthetic aperture, said multiple images establishing positional shift errors in said signal data, said preprocessing means operatively conected to the output of said first stage processing means to receive the output signal therfrom, said preprocessing means measuring the errors in said signal data from said first stage processing means, said preprocessing means providing an error correction signal in response to the measured error in said signal data, said preprocessing means applying said error correction signal to said second stage processing means.

2. A feature referenced error correction apparatus as described in claim 1 wherein said preprocessing means comprises in combination:

means for measuring error in said signal data from said first stage processing means, said error measuring means providing a measured error signal, and means for correcting error operatively connected to said error measuring means to receive said measured error signal therefrom, said error correcting means providing an error correction signal in response to said measured error signal to said second stage processing means.

3. A feature referenced error correction apparatus as described in claim 1 wherein said preprocessing means comprises in combination:

means for processing key features operatively connected to said first stage processing means, said key feature processing means receiving said signal data which comprises a plurality of interstage sub-aperture images, said key feature processing means extracting the key features from each image of said plurality of interstage sub-aperture images, said synthetic aperture radar comprising a plurality of sub-aperture segments, each sub-aperture segment having a sub-frame image associated therewith, each sub-frame image comprising a sub-aperture image, means for sub-frame registration operatively connected to said key feature processing means, said sub-frame registration means receiving said key features for each of said sub-frame images, said sub-frame registration means measuring the positional displacements of said key features in said sub-frame images, said sub-frame registration means generating a positional error signal in response to said positional displacements in said sub-frame images, and means for generating an error function operatively connected to said sub-frame registration means, said error generating means receiving said positional error signal from said sub-frame registration means and generating an error correction signal in response thereto, said error generating means applying said error correction signal to said second stage processing means.

4. A feature referenced error correction apparatus as described in claim 3 further including a bulk memory means operatively connected to said first stage processing means to receive said signal data therefrom, and means for combining signals operatively connected to said bulk memory means to receive said signal data therefrom, said signal combining means receiving said error correction signal from said error generating means, said signal combining means combining said signal data with said error correction signal to provide a corrected data signal to said second stage processing means.

* * * * *